US012655868B2

(12) United States Patent
Park et al.

(10) Patent No.: US 12,655,868 B2
(45) Date of Patent: Jun. 16, 2026

(54) AIR FOIL JOURNAL BEARING

(71) Applicant: Hanon Systems, Daejeon (KR)

(72) Inventors: Jun Hyuk Park, Daejeon (KR); Chi Yong Park, Daejeon (KR); Jong Sung Lee, Daejeon (KR); Kyu Sung Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/833,947

(22) PCT Filed: Mar. 24, 2023

(86) PCT No.: PCT/KR2023/003937
§ 371 (c)(1),
(2) Date: Jul. 29, 2024

(87) PCT Pub. No.: WO2023/224243
PCT Pub. Date: Nov. 23, 2023

(65) Prior Publication Data
US 2025/0154979 A1 May 15, 2025

(30) Foreign Application Priority Data
May 18, 2022 (KR) ......................... 10-2022-0060679

(51) Int. Cl.
*F16C 17/02* (2006.01)
*F16C 27/02* (2006.01)
(52) U.S. Cl.
CPC ............ *F16C 17/024* (2013.01); *F16C 27/02* (2013.01)

(58) Field of Classification Search
CPC ........ F16C 17/024; F16C 27/02; F16C 43/02; F16C 2226/76
See application file for complete search history.

(56) References Cited

U.S. PATENT DOCUMENTS 5,911,511 A * 6/1999 Saville ................... F16C 27/02
384/106
2005/0163407 A1 7/2005 Kang et al.
(Continued)

FOREIGN PATENT DOCUMENTS

KR 20070012591 A 1/2007
KR 101629714 B1 6/2016
(Continued)

OTHER PUBLICATIONS

International Search Report issued in PCT/KR2023/003937 on Jul. 6, 2023.

*Primary Examiner* — Phillip A Johnson
(74) *Attorney, Agent, or Firm* — NORTON ROSE FULBRIGHT US LLP

(57) ABSTRACT
The present invention relates to an air foil journal bearing including a bump foil and a top foil, in which one end and the other end of the top foil based on a circumferential direction are disposed with a step difference in a radial direction, and one end of the top foil is disposed radially inward of the other end of the top foil on the assumption that a direction in which the top foil extends from one end to the other end is identical to a rotation direction of a rotor disposed inside the top foil and configured to rotate, such that an additional fluid dynamic pressure is generated in the bearing, and asynchronous vibration components, which affect noise, are suppressed during a high-speed operation, which may improve driving stability.

13 Claims, 14 Drawing Sheets

(56)          References Cited

U.S. PATENT DOCUMENTS

2005/0185865  A1*   8/2005  Agrawal  ............... F16C 17/024
                                                                384/106
2015/0292552  A1    10/2015  Thompson et al.
2017/0067505  A1*   3/2017  Saville  .................... F16C 43/02

FOREIGN PATENT DOCUMENTS

KR          20190057833  A      5/2019
KR            102030622  B1    10/2019

* cited by examiner

AIR FOIL JOURNAL BEARING

CROSS REFERENCE TO RELATED APPLICATIONS

This patent application is a national phase under 35 U.S.C. § 371 of International Patent Application No. PCT/KR2023/003937 filed Mar. 24, 2023, which claims the benefit of priority from Korean Patent Application No. 10-2022-0060679 filed May 18, 2022, each of which is hereby incorporated herein by reference in its entirety for all purposes.

TECHNICAL FIELD

The present invention relates to an air foil journal bearing configured to support a radial load of a rotor.

BACKGROUND ART

An air foil bearing refers to a bearing that supports a load by means of pressure generated as air, which is a fluid having a viscosity, is introduced between foils that adjoin a rotor or bearing disc when a rotor (or rotary shaft) rotates at high speed.

Further, among the air foil bearings, an air foil journal bearing refers to a bearing configured to support a radial load of the rotor that is applied in a direction perpendicular to the rotor.

As illustrated in FIG. 1, in a general air foil journal bearing, a bump foil 20 is installed along an inner circumferential surface 12 of a hollow portion 11 of a bearing housing 10, and a top foil 30 is disposed inside the bump foil 20. A rotor 40 (or a rotary shaft) is disposed inside the top foil 30, such that the rotor may rotate in a state in which an inner circumferential surface of the top foil 30 and an outer circumferential surface of the rotor 40 are spaced apart from each other. Further, the bump foil 20 and the top foil 30 each have one end based on a circumferential direction, and one end has keys 21 and 31 bent outward in the radial direction. The keys 21 and 31 are fixedly inserted into a key groove 13 formed in the bearing housing 10. Therefore, when the rotor operates and rotates, pressure of air between a lower side of the rotor and the top foil increases, and the rotor floats from the lower side of the inner circumferential surface of the top foil and rotates.

However, in the general air foil journal bearing, one end of the top foil based on the circumferential direction is fixedly inserted into the key groove of the bearing housing, the other end of the top foil is formed as a free end, the free end is spaced apart from one end. For this reason, a free end side of the bearing is moved in an axial direction by external vibration or impact, and the top foil protrudes outward from the bearing housing and comes into contact with a rotating shaft, a runner, a rear surface of an impeller, and the like, which may damage the bearing. The damage to the bearing may directly cause damage to an air compressor in which the air foil journal bearing is mounted.

Therefore, in order to apply the air foil journal bearing to a driving environment to which external vibration is frequently applied, two opposite ends of the air foil journal bearing based on the circumferential direction need to be restrained. As illustrated in FIG. 2, in the air foil journal bearing, the keys 21 and 31 may be formed by bending, radially outward, the two opposite ends of the bump foil 20 based on the circumferential direction and the two opposite ends of the top foil 30 based on the circumferential direction, and the keys 21 and 31 may be inserted into the key groove 12 of the bearing housing so that the two opposite ends of the bump foil 20 based on the circumferential direction and the two opposite ends of the top foil 30 based on the circumferential direction may be fixed. However, the configuration in which the bearing is securely fixed improves durability of a rotary body against dynamic vibration but causes deteriorations in dynamic performance and driving stability of the rotary body during a high-speed operation.
[Document of Related Art][Patent Document] KR 10-1629714 A (Jun. 7, 2016)

DISCLOSURE

Technical Problem

The present invention has been made in an effort to solve the above-mentioned problem, and an object of the present invention is to provide an air foil journal bearing, in which foils of the air foil journal bearing may be securely fixed to a bearing housing to improve durability against vibration, and additional fluid dynamic pressure may be generated in the bearing to improve dynamic performance and driving stability of a rotary body during a high-speed operation.

Technical Solution

In order to achieve the above-mentioned object, an air foil journal bearing of the present invention may include: a bump foil provided inside a bearing housing, formed in a circumferential direction, and coupled to the bearing housing; and a top foil provided inside the bump foil, formed in the circumferential direction, and configured such that one end and the other end of the top foil based on the circumferential direction are disposed adjacent to each other, top foil keys extend radially outward from the two opposite ends based on the circumferential direction, and the top foil keys are inserted into a key groove of the bearing housing, in which one end and the other end of the top foil based on the circumferential direction are disposed with a step difference in the radial direction, and in which one end of the top foil is disposed inward of the other end of the top foil in the radial direction when a direction in which the top foil extends from one end to the other end is identical to a rotation direction of a rotor disposed inside the top foil and configured to rotate.

In addition, a length La of a first top foil key extending from one end of the top foil based on the circumferential direction may be longer than a length Lb of a second top foil key extending from the other end of the top foil based on the circumferential direction.

In addition, a top foil key bent portion may extend in a width direction, in which the second top foil key faces the first top foil key, from an outer end of the second top foil key based on the radial direction toward the first top foil key, and an outer end of the first top foil key based on the radial direction may be disposed adjacent to an inner surface of the top foil key bent portion in the radial direction.

In addition, the air foil journal bearing may further include: the bearing housing having a hollow portion formed in an axial direction, in which the bump foil and the top foil are disposed inside the hollow portion, the key groove is formed to be connected to the hollow portion, and the first top foil key and the second top foil key of the top foil are inserted and coupled into the key groove.

In addition, a width Lc of the top foil key bent portion may satisfy Equation 1 below when a width of the key groove of the bearing housing is E, $$Lc = (E/2) \times 1.2. \qquad \text{(Equation 1)}$$

In addition, the air foil journal bearing may further include: a mid-foil interposed between the bump foil and the top foil, formed in the circumferential direction, and configured such that mid-foil keys extend radially outward from two opposite ends based on the circumferential direction, and the mid-foil keys are inserted into the key groove of the bearing housing.

In addition, a length La of a first top foil key extending from one end of the top foil based on the circumferential direction may be longer than a length Lb of a second top foil key extending from the other end of the top foil, a first mid-foil key may extend from one end of the mid-foil based on the circumferential direction, a second mid-foil key may extend from the other end of the mid-foil based on the circumferential direction, and the first and second mid-foil keys may be formed to correspond to the lengths of the first and second top foil keys respectively adjacent to the first and second mid-foil keys.

In addition, a top foil key bent portion may extend in a width direction, in which the second top foil key faces the first top foil key, from an outer end of the second top foil key based on the radial direction toward the first top foil key, an outer end of the first top foil key based on the radial direction may be disposed adjacent to an inner surface of the top foil key bent portion in the radial direction, and a mid-foil key bent portion may extend from the outer end of the first mid-foil key based on the radial direction and correspond to the top foil key bent portion.

In addition, a width of the mid-foil key bent portion may be smaller than a width of the top foil key bent portion based on the first mid-foil key of the mid-foil.

In addition, a length La of a first top foil key connected to one end of the top foil based on the circumferential direction may be equal to a length Lb of a second top foil key extending from the other end of the top foil based on the circumferential direction, one end of the top foil based on the circumferential direction may be disposed adjacent to the first top foil key, and one end of the top foil based on the circumferential direction and an inner end of the first top foil key based on the radial direction may be connected by an inclined portion.

In addition, a length La of a first top foil key extending from one end of the top foil based on the circumferential direction may be longer than a length Lb of a second top foil key connected to the other end of the top foil based on the circumferential direction, and a stepped portion may be formed with a step difference radially inward from the other end of the top foil based on the circumferential direction in a direction opposite to a rotation direction of the rotor.

In addition, an inner end of the stepped portion based on the radial direction may be disposed on the same circumferential line as one end of the top foil.

In addition, the top foil keys of the top foil may be disposed at an upper side of the rotor based on a gravitational direction.

Advantageous Effects

According to the present invention, in the air foil journal bearing configured to support a radial load of the rotor, the two opposite ends of the top foil based on the circumferential direction are securely fixed in the key groove of the bearing housing, which may improve the durability against vibration. Further, the additional fluid dynamic pressure may be generated in the bearing, such that asynchronous vibration components, which affect noise, may be suppressed during a high-speed operation, which may improve the driving stability.

MODE FOR INVENTION

Hereinafter, an air foil journal bearing of the present invention configured as described above will be described in detail with reference to the accompanying drawings.

Embodiment 1

Figure 1:
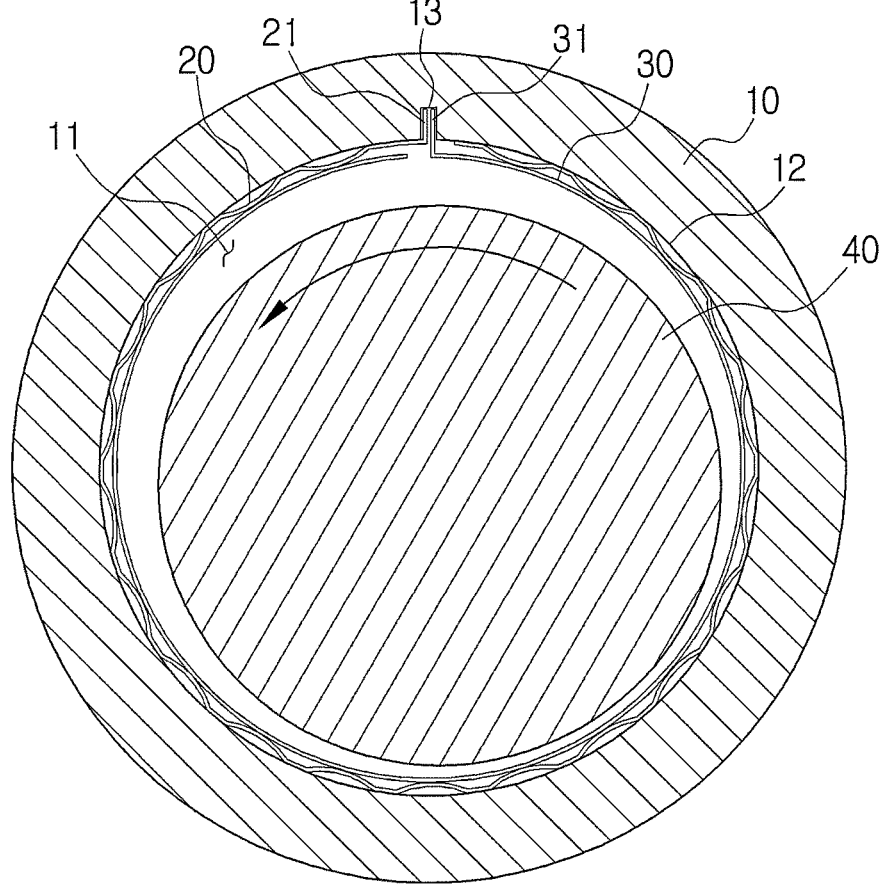
FIGS. 1 and 2 are cross-sectional views illustrating air foil journal bearings in the related art.
Figure 2:
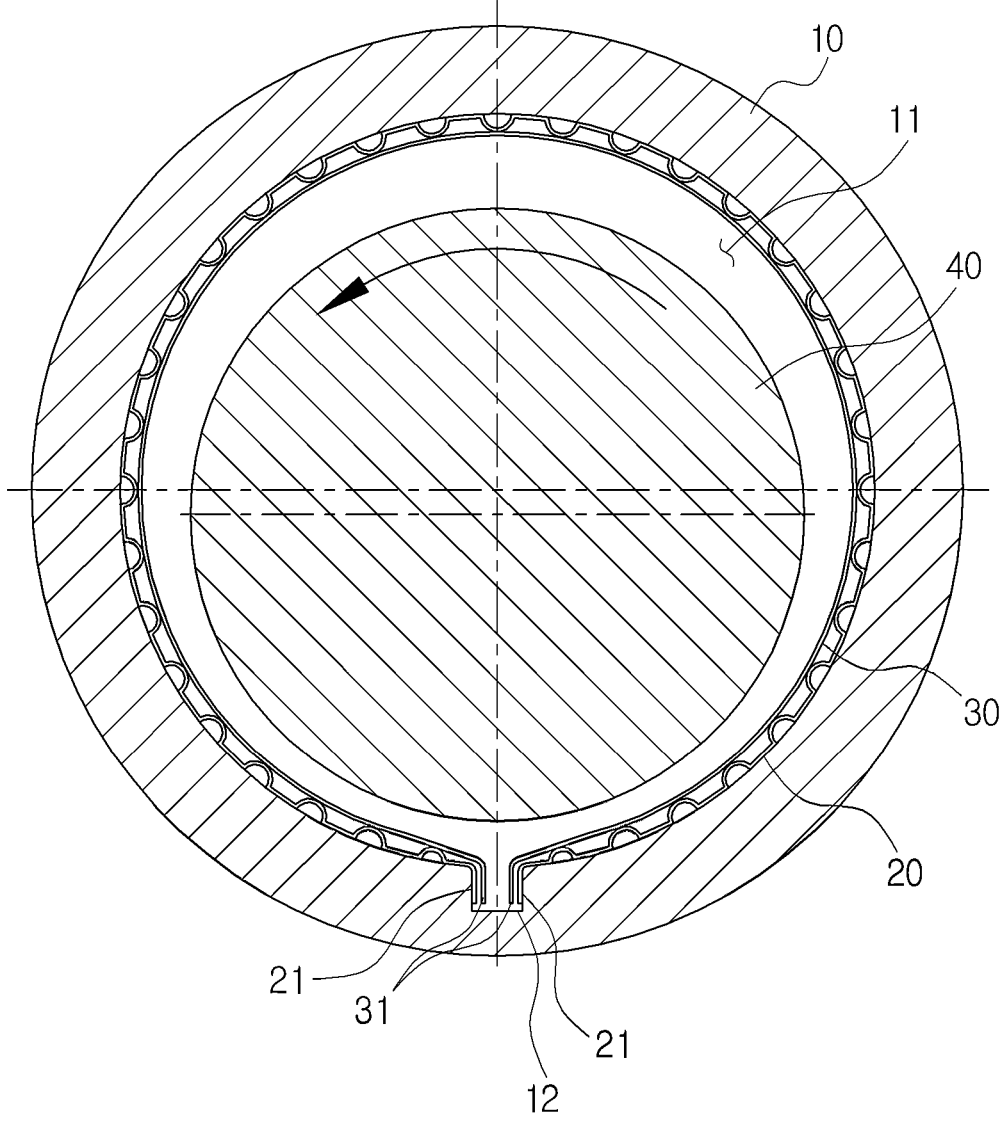
Figure 3:
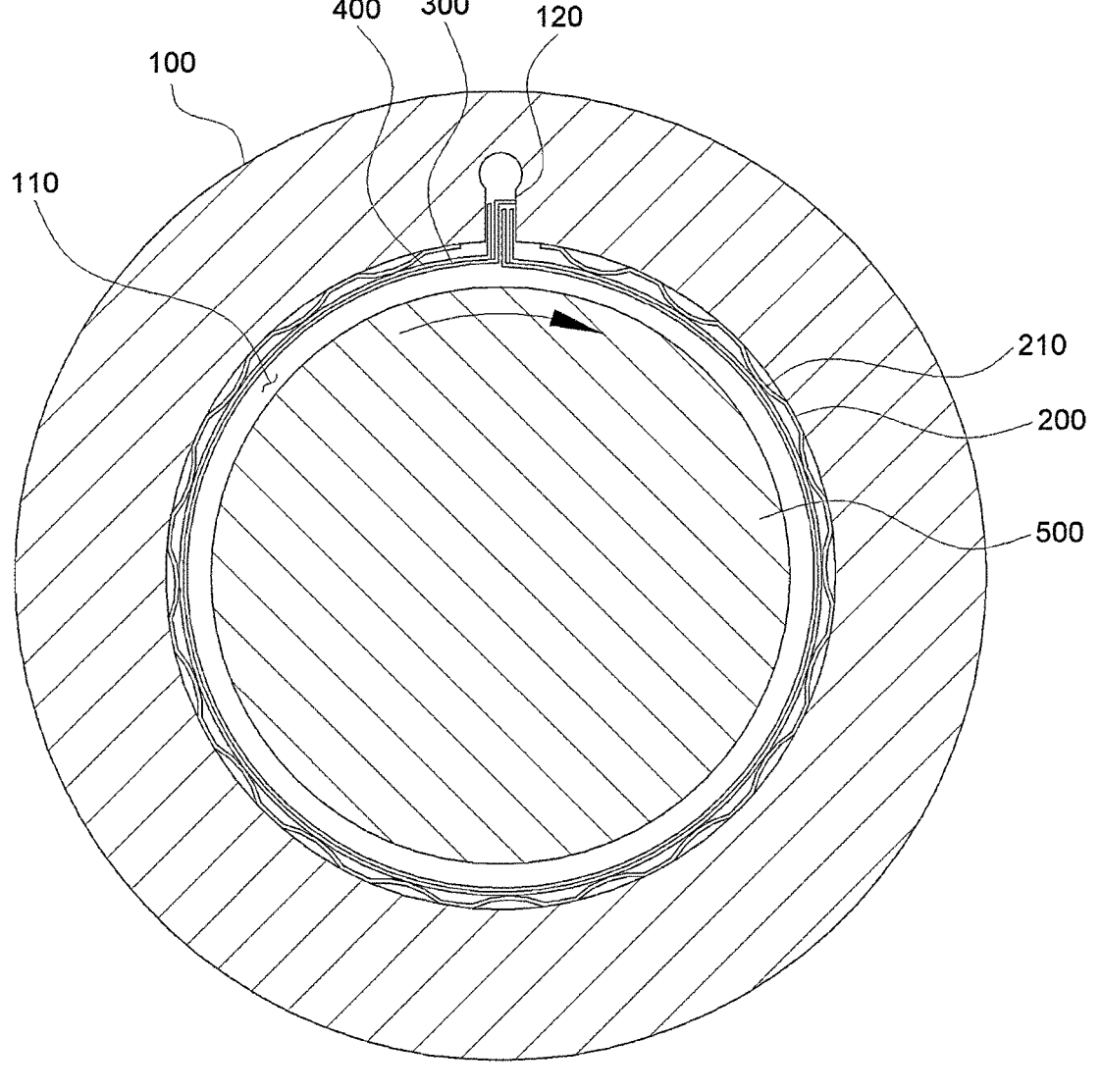
FIGS. 3 to 5 are a cross-sectional view and partially enlarged views illustrating an air foil journal bearing according to a first embodiment of the present invention.
Figure 4:
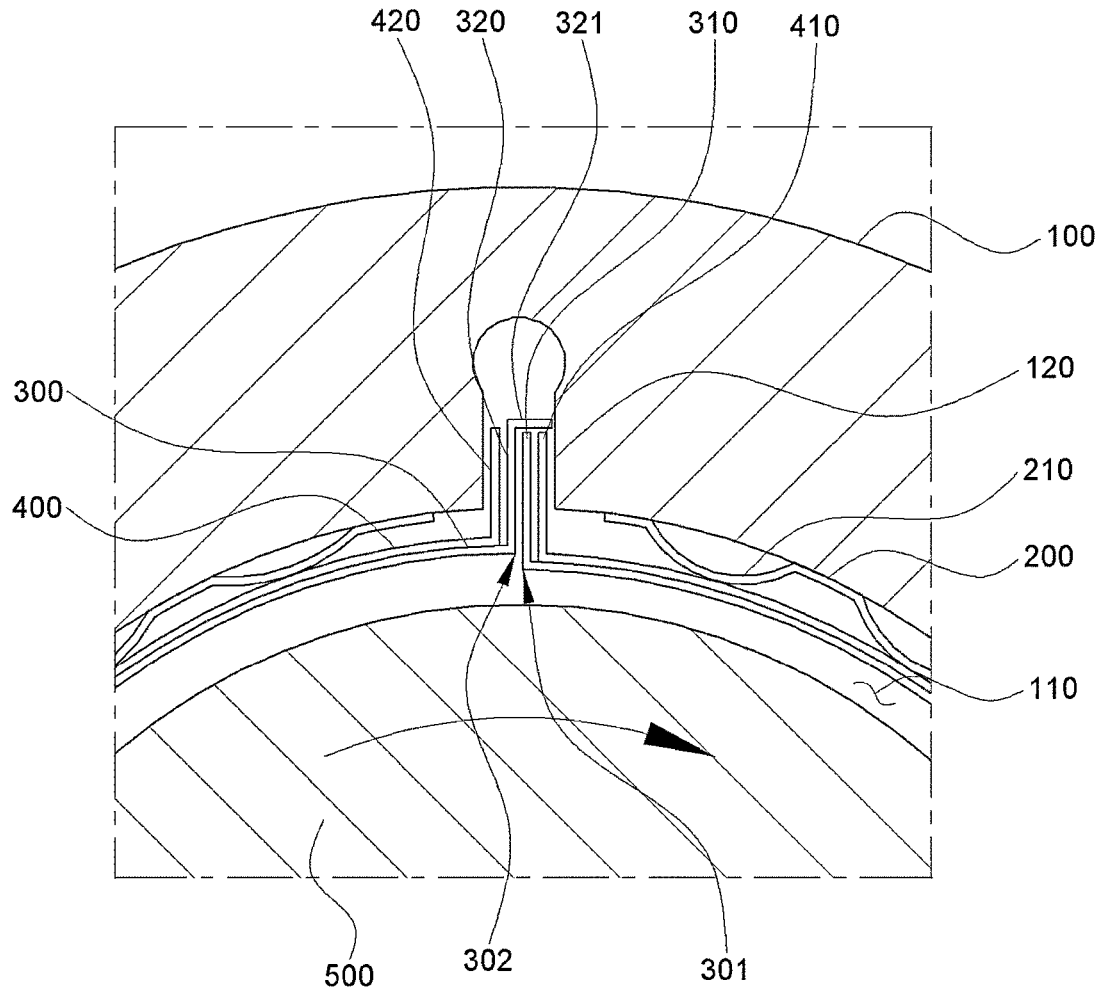
Figure 5:
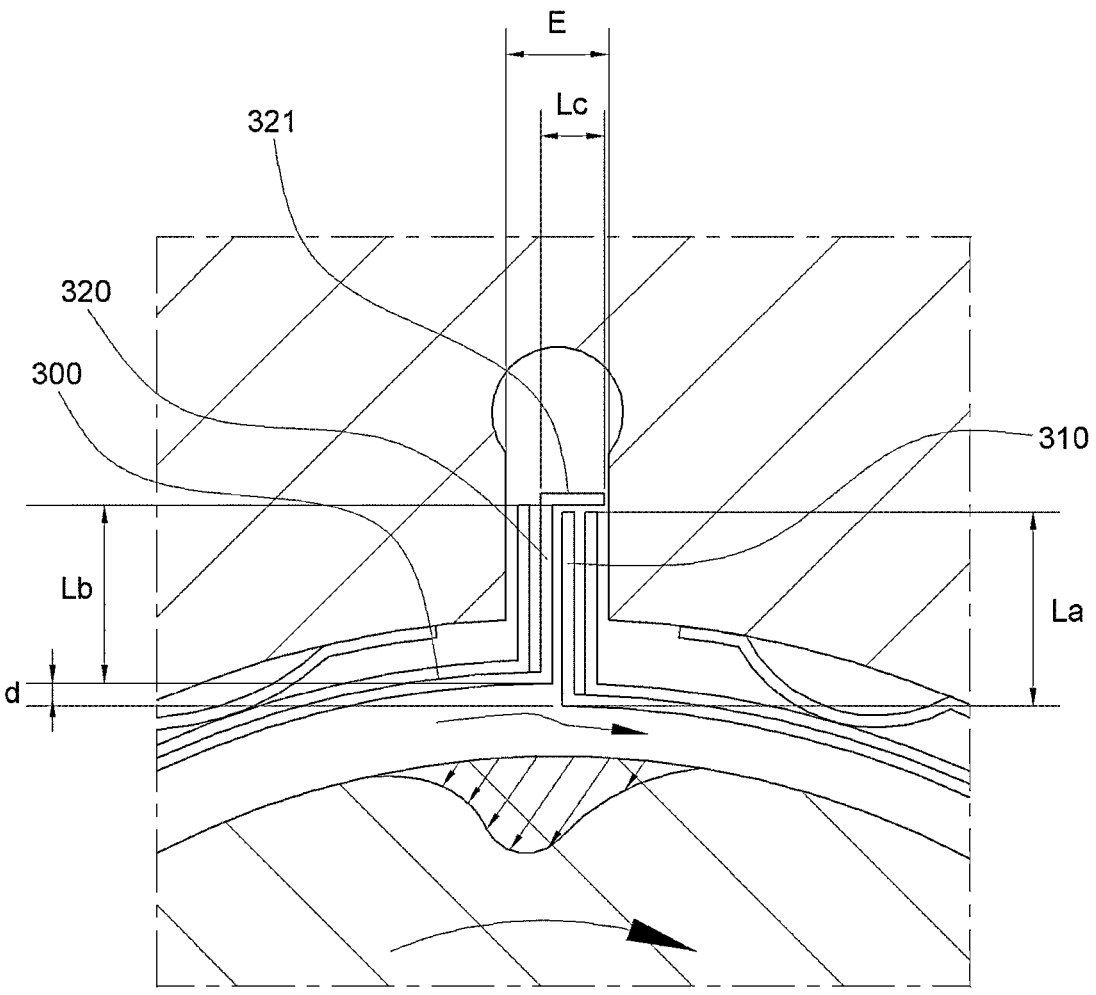

FIGS. 3 and 4 are a cross-sectional view and a partially enlarged view illustrating an air foil journal bearing according to a first embodiment of the present invention.

As illustrated, the air foil journal bearing according to the first embodiment of the present invention may broadly include a bump foil 200 and a top foil 300 and further include a bearing housing 100. Hereinafter, an embodiment including all the bearing housing 100, the bump foil 200, and the top foil 300 will be described.

The bearing housing 100 may have therein a hollow portion 110 formed through two opposite surfaces of the bearing housing 100 in a central axis direction. Further, a key groove 120 may be formed concavely radially outward in an inner peripheral surface of an upper side of the bearing housing 100 and communicate with the hollow portion 110. The key groove 120 may be formed in a continuous shape in the central axis direction.

The bump foil 200 may be disposed inside the hollow portion 110 of the bearing housing 100. The bump foil 200 may be formed in a shape extending in a circumferential direction. Further, the bump foil 200 may be fixedly coupled to the bearing housing 100 in various shapes. Although not illustrated, for example, the bump foil 200 may have bump foil keys formed in shapes bent radially outward from one end or two opposite ends of the bump foil 200 based on the circumferential direction. The bump foil keys may be inserted and coupled into the key groove 120 of the bearing housing 100. In addition, the bump foil 200 may be disposed in the circumferential direction while being in close contact with the inner circumferential surface of the bearing housing 100. The bump foil 200 may be formed in a plate shape with a small thickness and have a plurality of elastic bumps 210 spaced apart from one another in the circumferential direction and protruding convexly inward. In addition, the bump foil 200 may be formed as a single sheet of bump foil or two or more sheets of bump foils.

The top foil 300 may be provided inside the bump foil 200 and formed in the circumferential direction. Further, the top foil 300 may be formed in a shape extending from one end to the other end based on the circumferential direction clockwise by slightly less than one turn. One end and the other end of the top foil 300 based on the circumferential direction may be disposed adjacent to each other. In addition, the top foil 300 may have top foil keys bent in shapes extending radially outward from two opposite ends of the top foil 300 based on the circumferential direction. A first top foil key 310, which is connected to one end of the top foil based on the circumferential direction, and a second top foil key 320, which is connected to the other end of the top foil, may be inserted into the key groove 120 of the bearing housing 100. In this case, the first top foil key 310 and the second top foil key 320 of the top foil 300 may be disposed at an upper side of a rotor 500 based on a gravitational direction. Further, on the assumption that a direction in which the top foil 300 extends from one end 301 to the other end 302 in the circumferential direction is identical to a rotation direction of the rotor 500 disposed inside the top foil 300 and configured to rotate, one end 301 of the top foil 300 is disposed radially inward of the other end 302, such that a step difference d may be defined.

Therefore, when the rotor 500 rotates, an additional pressure gradient is defined as air, which flows between the rotor 500 and the top foil 300, passes through a portion where one end 301 and the other end 302 of the top foil 300 are disposed. As a result, asynchronous vibration components, which affect noise during a high-speed operation, may be suppressed, which may improve driving stability. That is, when the rotor 500 rotates at a high speed, the rotor 500 may float from the top foil 300 by a pressure field formed by air flowing between the top foil 300 and a lower side of the rotor 500 based on the gravitational direction. In this case, an additional pressure gradient is defined while the air passes through the portion where one end 301 and the other end 302 of the top foil 300 are disposed. As a result, asynchronous vibration components, which affect noise during a high-speed operation, may be suppressed, which may improve driving stability.

Figure 6:
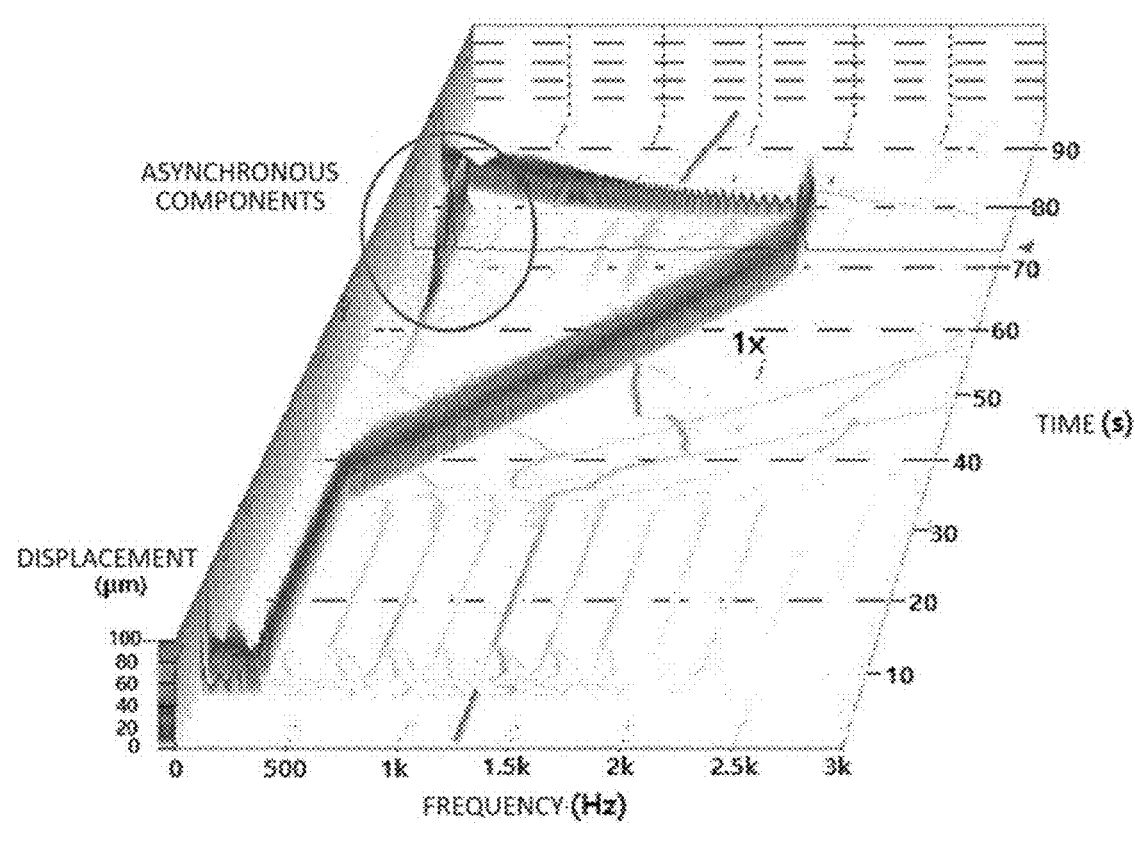
FIGS. 6 and 7 are graphs illustrating results of evaluating driving stability of an air foil journal bearing in the related art in which there is no step difference between one end and the other end of a top foil.
Figure 7:
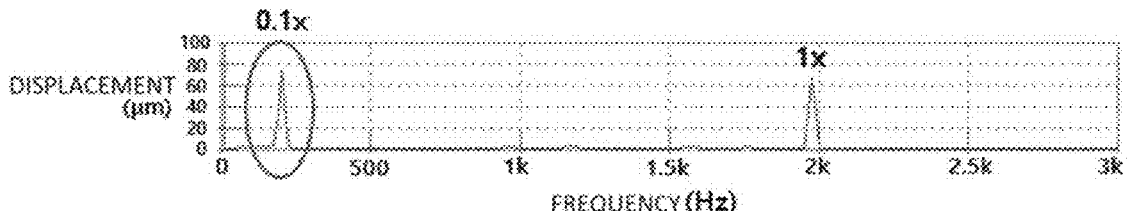
Figure 8:
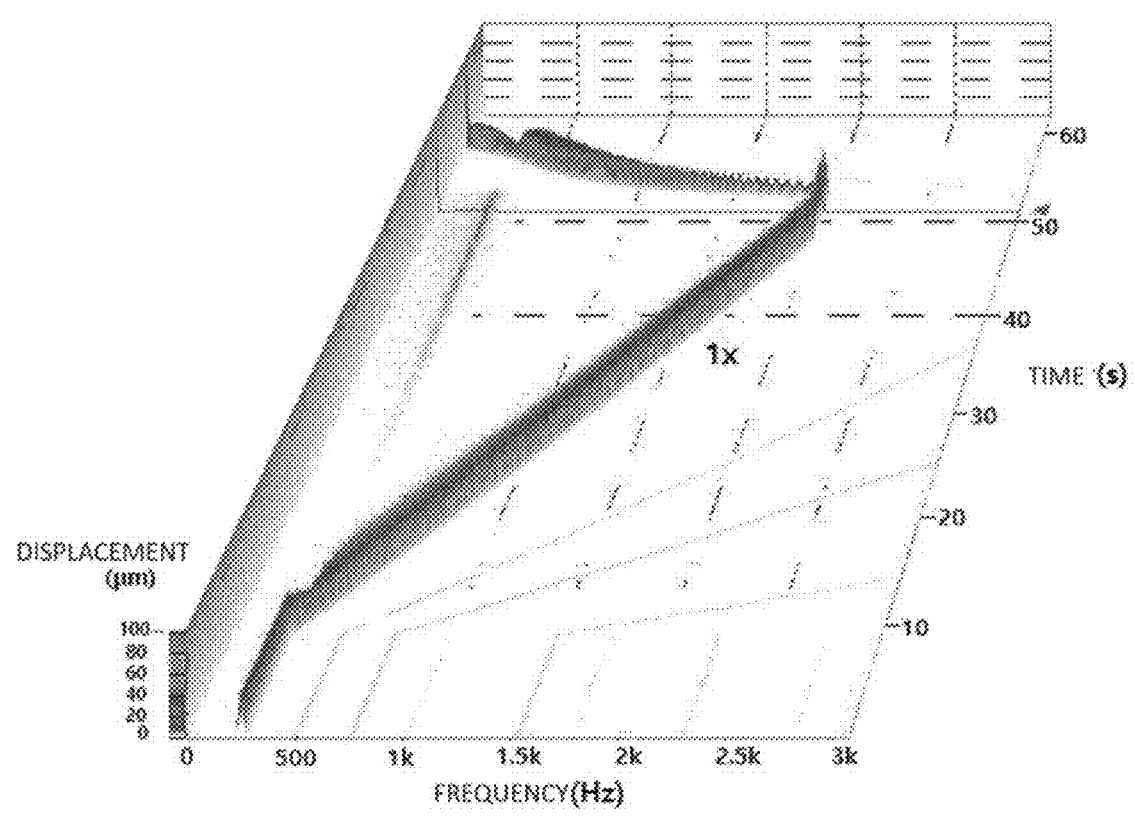
FIGS. 8 and 9 are graphs illustrating results of evaluating driving stability of the air foil journal bearing of the present invention in which there is a step difference between one end and the other end of a top foil.
Figure 9:
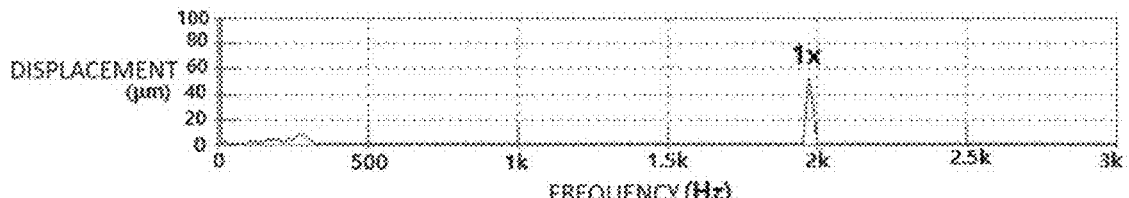

FIGS. 6 and 7 are graphs illustrating results of evaluating driving stability of an air foil journal bearing in the related art in which there is no step difference between one end and the other end of a top foil, and FIGS. 8 and 9 are graphs illustrating results of evaluating driving stability of the air foil journal bearing of the present invention in which there is a step difference between one end and the other end of a top foil.

With reference to FIGS. 6 and 7, in the air foil journal bearing in the related art in which the top foil has no step difference, displacements asynchronous components, which corresponds to 0.1× of a frequency (Hz) in accordance with the rotation of the rotor was measured to be relatively very large. In contrast, with reference to FIGS. 8 and 9, it can be seen that the asynchronous components are remarkably reduced in the air foil journal bearing of the present invention to which a step difference is applied.

In addition, a length La of the first top foil key 310 extending from one end of the top foil 300 based on the circumferential direction is longer than a length Lb of the second top foil key 320 extending from the other end of the top foil 300 based on the circumferential direction, such that one end and the other end of the top foil 300 based on the circumferential direction may be disposed with the step difference d in the radial direction. Therefore, even though the top foil 300 is pushed radially outward by pressure of the air, the step difference d between one end and the other end of the top foil 300 based on the circumferential direction may be maintained.

In addition, a top foil key bent portion 321 may extend in a width direction, in which the second top foil key 320 faces the first top foil key 310, from an outer end of the second top foil key 320 of the top foil 300 based on the radial direction toward the first top foil key 310, and the outer end of the first top foil key 310 based on the radial direction may be disposed in an inner surface of the top foil key bent portion 321 in the radial direction. Therefore, it is easy to maintain the step difference d between one end and the other end of the top foil 300 based on the circumferential direction, and the top foil key bent portion 321 may be supported on an inner wall of the key groove 120, which may prevent the top foil 300 from being pushed by the rotor 500 and withdrawn or damaged. In this case, the step difference d may be a value made by subtracting the length Lb of the second top foil key 320 from the length La of the first top foil key 310. In the drawings, an upper end of the first top foil key 310 is illustrated as being slightly spaced apart from the top foil key bent portion 321. However, the length La of the first top foil key 310 and the length Lb of the second top foil key 320 may be defined so that the step difference d may be defined even in a state in which the upper end of the first top foil key 310 is in contact with the top foil key bent portion 321.

In addition, when a width of the key groove 120 of the bearing housing 100 is E, a width Lc of the top foil key bent portion 321 may be defined to satisfy Equation 1 below.

$$Lc=(E/2)\times 1.2 \tag{Equation 1}$$

Therefore, the first top foil key 310, the second top foil key 320, and the top foil key bent portion 321 of the top foil 300 may be smoothly inserted into the key groove 120, and the step difference d between one end and the other end of the top foil 300 based on the circumferential direction may be easily maintained.

In addition, the air foil journal bearing of the present invention may further include a mid-foil 400. The mid-foil 400 may be interposed between the bump foil 200 and the top foil 300 and formed in the circumferential direction. Further, a first mid-foil key 410 may extend radially outward from one end of the mid-foil 400 based on the circumferential direction, and a second mid-foil key 420 may extend radially outward from the other end of the mid-foil 400 based on the circumferential direction, such that the first mid-foil key 410 and the second mid-foil key 420 may be inserted into the key groove 120. In addition, the first mid-foil key 410 and the second mid-foil key 420 may be formed to correspond to the lengths of the first and second top foil keys 310 and 320 respectively adjacent to the first and second mid-foil keys 410 and 420. In this case, an outer end of the first mid-foil key 410 based on the radial direction may be disposed adjacent to the inner surface of the top foil key bent portion 321 in the radial direction.

Figure 10:
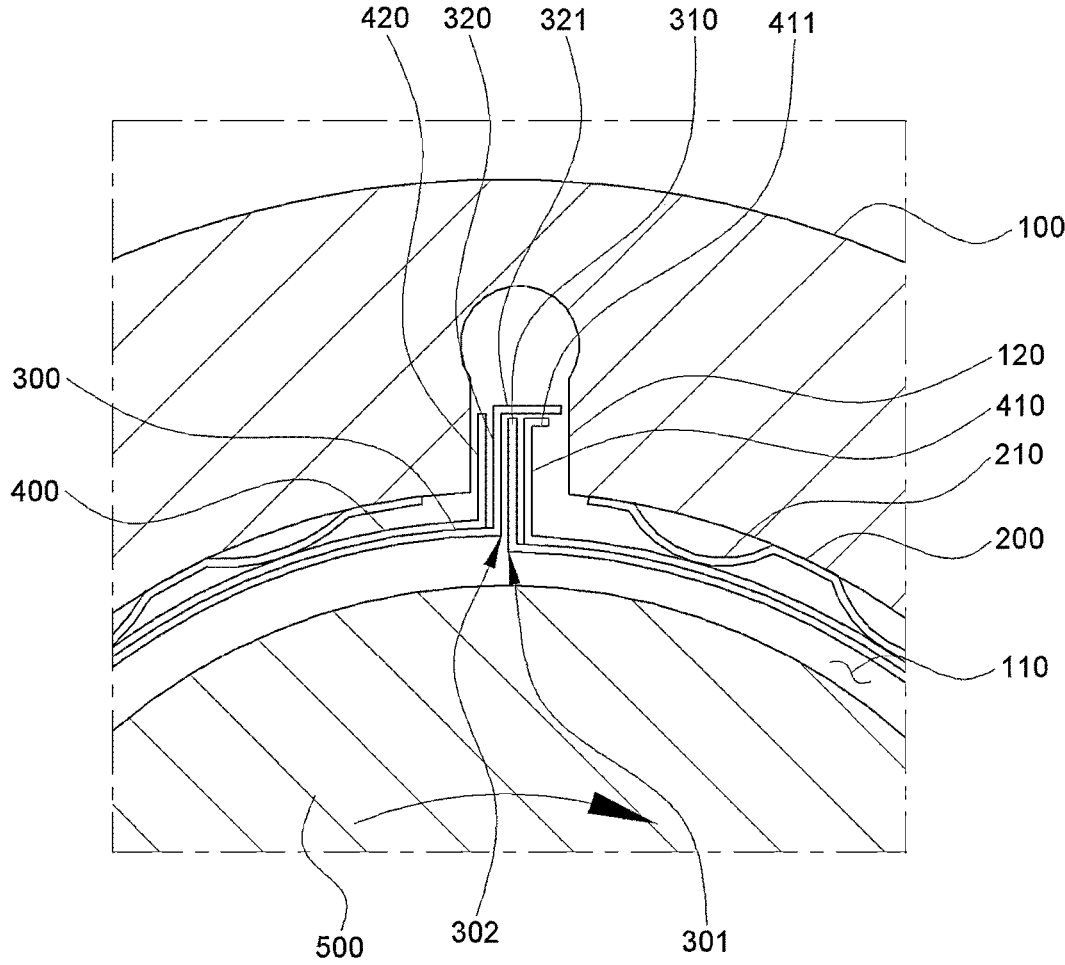
FIG. 10 is a partial cross-sectional view illustrating an air foil journal bearing according to a second embodiment of the present invention.

FIG. 10 is a partial cross-sectional view illustrating an air foil journal bearing according to a second embodiment of the present invention.

As illustrated, a mid-foil key bent portion 411 may be formed at the outer end of the first mid-foil key 410 based on the radial direction and correspond to the top foil key bent portion 321. In this case, based on the first mid-foil key 410 of the mid-foil 400, a width of the mid-foil key bent portion 411 may be smaller than a width of the top foil key bent portion 321. In this case, the mid-foil key bent portion 411 may extend in the same direction as the top foil key bent portion 321. A free end of the mid-foil key bent portion 411 may have a slightly shorter shape than a free end of the top foil key bent portion 321 in the width direction of the key groove 120.

Figure 11:
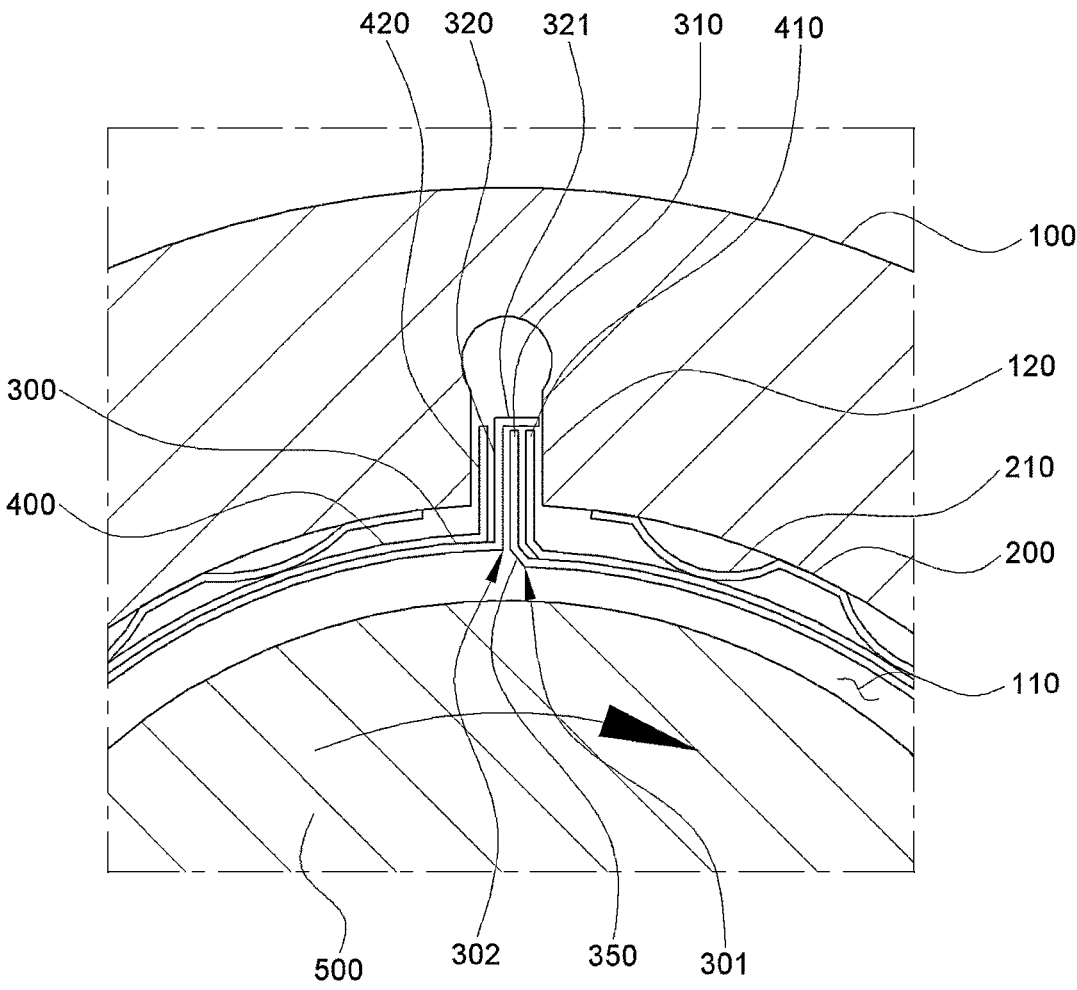
FIG. 11 is a partial cross-sectional view illustrating an air foil journal bearing according to a third embodiment of the present invention.
Figure 12:
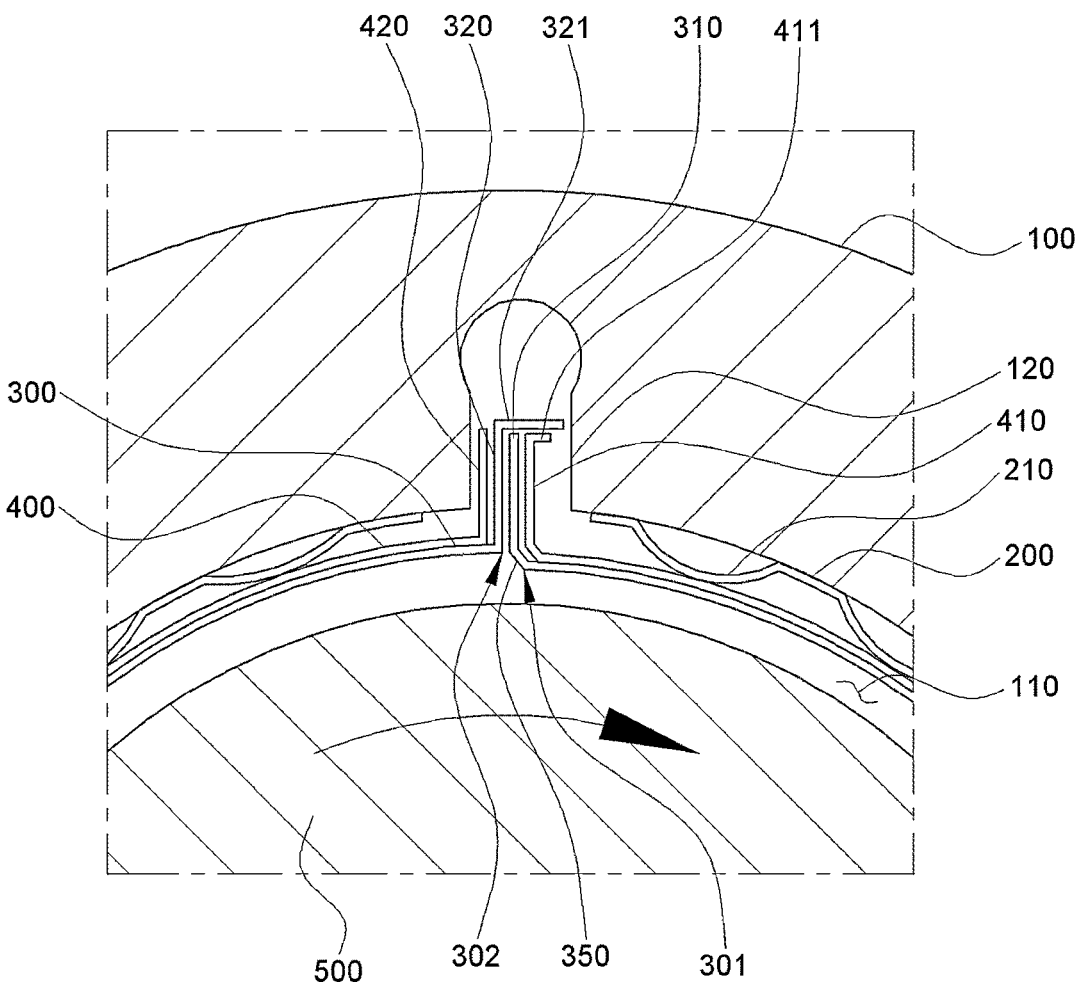
FIG. 12 is a partial cross-sectional view illustrating an air foil journal bearing according to a fourth embodiment of the present invention.

FIG. 11 is a partial cross-sectional view illustrating an air foil journal bearing according to a third embodiment of the present invention, and FIG. 12 is a partial cross-sectional view illustrating an air foil journal bearing according to a fourth embodiment of the present invention.

As illustrated, the length La of the first top foil key 310, which is connected to one end of the top foil 300 in the circumferential direction, may be equal to the length Lb of the second top foil key 320 extending from the other end of the top foil 300 based on the circumferential direction. One end of the top foil 300 based on the circumferential direction may be disposed to be spaced apart from the first top foil key 310 and connected to one end of the top foil 300 based on the circumferential direction and the inner end of the first top foil key 310 based on the radial direction by an inclined portion 350. Therefore, one end 301 of the top foil 300 may be disposed radially inward of the other end 302, such that the step difference may be defined. In this case, the mid-foil 400 may be formed in a shape corresponding to the inclined portion 350 of the top foil 300, and the mid-foil key bent portion 411 may be formed at the outer end of the first mid-foil key 410 based on the radial direction.

Figure 13:
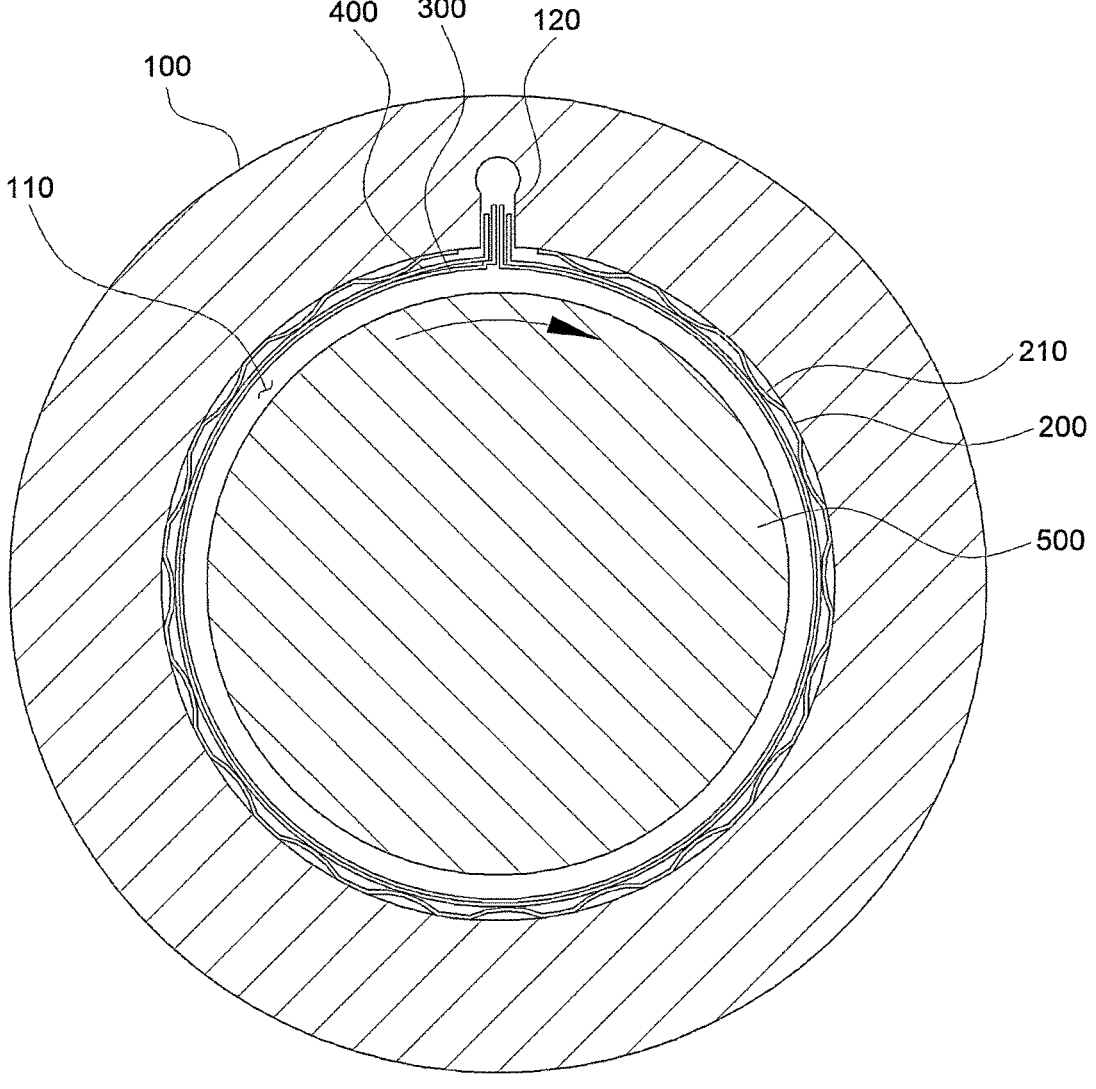
FIGS. 13 and 14 are a cross-sectional view and a partially enlarged view illustrating an air foil journal bearing according to a fifth embodiment of the present invention.
Figure 14:
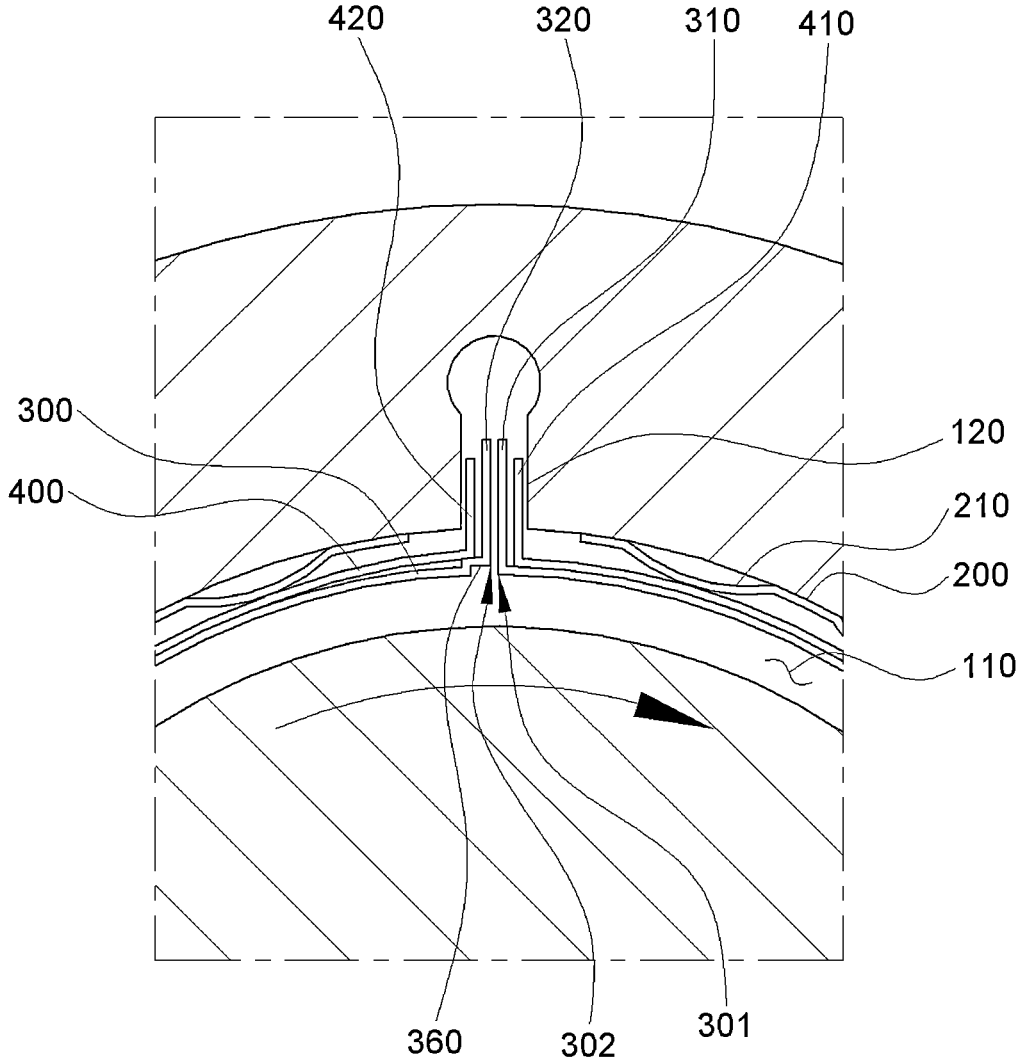

FIGS. 13 and 14 are a cross-sectional view and a partially enlarged view illustrating an air foil journal bearing according to a fifth embodiment of the present invention.

As illustrated, the length La of the first top foil key 310, which extends from one end of the top foil 300 based on the circumferential direction, may be longer than the length Lb of the second top foil key 320 connected to the other end of the top foil 300 based on the circumferential direction. A stepped portion 360 may be formed with a step difference radially inward from the other end of the top foil 300 based on the circumferential direction in a direction opposite to the rotation direction of the rotor 500. In this case, an inner end of the stepped portion 360 based on the radial direction may be disposed on the same circumferential line as one end of the top foil 300 based on the circumferential direction. Therefore, a step difference may be defined in the radial direction between one end and the other end of the top foil 300 based on the circumferential direction by the stepped portion 360, such that an additional pressure gradient may be defined, which may improve dynamic stability.

The present invention is not limited to the above-mentioned embodiments, and the scope of application is diverse. Of course, various modifications and implementations made by any person skilled in the art to which the present invention pertains without departing from the subject matter of the present invention claimed in the claims.

DESCRIPTION OF REFERENCE NUMERALS

100: Bearing housing
110: Hollow portion, 120: Key groove,

200: Bump foil, 210: Elastic bump,
300: Top foil, 301: One end,
302: The other end, 310: First top foil key,
320: Second top foil key, 321: Top foil key bent portion,
350: Inclined portion, 360: Stepped portion,
400: Mid-foil, 410: First mid-foil key,
420: Second mid-foil key, 421: Mid-foil key bent portion,
500: Rotor

The invention claimed is:

1. An air foil journal bearing comprising:
a bump foil provided inside a bearing housing, formed in a circumferential direction, and coupled to the bearing housing; and
a top foil provided inside the bump foil, formed in the circumferential direction, and configured such that one end and the other end of the top foil based on the circumferential direction are disposed adjacent to each other, top foil keys extend radially outward from the two opposite ends based on the circumferential direction, and the top foil keys are inserted into a key groove of the bearing housing,
wherein the one end and the other end of the top foil based on the circumferential direction are disposed with a step difference in the radial direction,
wherein the one end of the top foil is disposed inward of the other end of the top foil in the radial direction when a direction in which the top foil extends from the one end to the other end is identical to a rotation direction of a rotor disposed inside the top foil and configured to rotate,
wherein a length La of a first top foil key extending from the one end of the top foil based on the circumferential direction is longer than a length Lb of a second top foil key extending from the other end of the top foil based on the circumferential direction,
wherein a top foil key bent portion extends in a width direction, in which the second top foil key faces the first top foil key, from an outer end of the second top foil key based on the radial direction toward the first top foil key, and
wherein an outer end of the first top foil key based on the radial direction is disposed adjacent to an inner surface of the top foil key bent portion in the radial direction.

2. The air foil journal bearing of claim 1, further comprising:
the bearing housing having a hollow portion formed in an axial direction,
wherein the bump foil and the top foil are disposed inside the hollow portion, the key groove is formed to be connected to the hollow portion, and the first top foil key and the second top foil key of the top foil are inserted and coupled into the key groove.

3. The air foil journal bearing of claim 2, wherein a width Lc of the top foil key bent portion satisfies Equation 1 below when a width of the key groove of the bearing housing is E, $$Lc = (E/2) \times 1.2. \qquad \text{(Equation 1)}$$

4. The air foil journal bearing of claim 1, further comprising:
a mid-foil interposed between the bump foil and the top foil, formed in the circumferential direction, and configured such that mid-foil keys extend radially outward from two opposite ends based on the circumferential direction, and the mid-foil keys are inserted into the key groove of the bearing housing.

5. The air foil journal bearing of claim 4, wherein a length La of a first top foil key extending from the one end of the top foil based on the circumferential direction is longer than a length Lb of a second top foil key extending from the other end of the top foil, and wherein a first mid-foil key extends from one end of the mid-foil based on the circumferential direction, a second mid-foil key extends from the other end of the mid-foil based on the circumferential direction, and the first and second mid-foil keys are formed to correspond to the lengths of the first and second top foil keys respectively adjacent to the first and second mid-foil keys.

6. The air foil journal bearing of claim 5, wherein a top foil key bent portion extends in a width direction, in which the second top foil key faces the first top foil key, from an outer end of the second top foil key based on the radial direction toward the first top foil key, wherein an outer end of the first top foil key based on the radial direction is disposed adjacent to an inner surface of the top foil key bent portion in the radial direction, and wherein a mid-foil key bent portion extends from the outer end of the first mid-foil key based on the radial direction and corresponds to the top foil key bent portion.

7. The air foil journal bearing of claim 6, wherein a width of the mid-foil key bent portion is smaller than a width of the top foil key bent portion based on the first mid-foil key of the mid-foil.

8. The air foil journal bearing of claim 1, wherein a length La of a first top foil key connected to the one end of the top foil based on the circumferential direction is equal to a length Lb of a second top foil key extending from the other end of the top foil based on the circumferential direction, wherein the one end of the top foil based on the circumferential direction is disposed adjacent to the first top foil key, and wherein the one end of the to foil based on the circumferential direction and an inner end of the first top foil key based on the radial direction are connected by an inclined portion.

9. The air foil journal bearing of claim 1, wherein a length La of a first top foil key extending from the one end of the top foil based on the circumferential direction is longer than a length Lb of a second top foil key connected to the other end of the top foil based on the circumferential direction, and wherein a stepped portion is formed with the step difference radially inward from the other end of the top foil based on the circumferential direction in a direction opposite to a rotation direction of the rotor.

10. The air foil journal bearing of claim 9, wherein an inner end of the stepped portion based on the radial direction is disposed on the same circumferential line as the one end of the top foil.

11. The air foil journal bearing of claim 1, wherein the top foil keys of the top foil are disposed at an upper side of the rotor based on a gravitational direction.

12. An air foil journal bearing comprising:
a bump foil provided inside a bearing housing, formed in a circumferential direction, and coupled to the bearing housing; and
a top foil provided inside the bump foil, formed in the circumferential direction, and configured such that one end and the other end of the top foil based on the circumferential direction are disposed adjacent to each other, top foil keys extend radially outward from the two opposite ends based on the circumferential direction, and the top foil keys are inserted into a key groove of the bearing housing, wherein one end and the other end of the top foil based on the circumferential direction are disposed with a step difference in the radial direction, wherein one end of the top foil is disposed inward of the other end of the top foil in the radial direction when a direction in which the top foil extends from one end to the other end is identical to a rotation direction of a rotor disposed inside the top foil and configured to rotate, wherein a length La of a first top foil key connected to one end of the top foil based on the circumferential direction is equal to a length Lb of a second top foil key extending from the other end of the top foil based on the circumferential direction, wherein one end of the top foil based on the circumferential direction is disposed adjacent to the first top foil key, and wherein one end of the top foil based on the circumferential direction and an inner end of the first top foil key based on the radial direction are connected by an inclined portion.

13. An air foil journal bearing comprising:

a bump foil provided inside a bearing housing, formed in a circumferential direction, and coupled to the bearing housing; and a top foil provided inside the bump foil, formed in the circumferential direction, and configured such that one end and the other end of the top foil based on the circumferential direction are disposed adjacent to each other, top foil keys extend radially outward from the two opposite ends based on the circumferential direction, and the top foil keys are inserted into a key groove of the bearing housing, wherein one end and the other end of the top foil based on the circumferential direction are disposed with a step difference in the radial direction, wherein one end of the top foil is disposed inward of the other end of the top foil in the radial direction when a direction in which the top foil extends from one end to the other end is identical to a rotation direction of a rotor disposed inside the top foil and configured to rotate, wherein a length La of a first top foil key extending from one end of the top foil based on the circumferential direction is longer than a length Lb of a second top foil key connected to the other end of the top foil based on the circumferential direction, and wherein a stepped portion is formed with a step difference radially inward from the other end of the top foil based on the circumferential direction in a direction opposite to a rotation direction of the rotor.

\* \* \* \* \*